United States Patent [19]

Rinaldo

[11] 4,064,766
[45] Dec. 27, 1977

[54] MODULAR CONTROL LINKAGE ASSEMBLY FOR A HYDROSTATIC TRANSMISSION

[75] Inventor: James D. Rinaldo, Joliet, Ill.

[73] Assignee: Caterpillar Tractor Co., Peoria, Ill.

[21] Appl. No.: 806,804

[22] Filed: June 15, 1977

[51] Int. Cl.² .................. G05G 11/00; F15B 13/09
[52] U.S. Cl. .......................... 74/473 R; 74/480 R; 60/486; 91/413; 417/426
[58] Field of Search .............. 417/216, 426, 429, 454; 74/473 R, 480 R, 856; 91/413; 92/13.3; 60/486

[56] References Cited

U.S. PATENT DOCUMENTS

| | | | |
|---|---|---|---|
| 3,772,964 | 11/1973 | Erickson et al. | 91/413 X |
| 3,990,320 | 11/1976 | Habiger | 74/473 |
| 3,995,426 | 12/1976 | Habiger | 60/486 |

*Primary Examiner*—Edgar W. Geoghegan
*Attorney, Agent, or Firm*—John W. Grant

[57] ABSTRACT

A hydrostatic transmission has a pair of variable displacement overcenter hydraulic pumps and first and second rotary servo valves. Each servo valve has a housing connected to the respective pump and a valve spool rotatably positioned within the housing for controlling the output displacement of the respective pump. A mounting plate extends between and is releasably connected to the housings of the first and second servo valves. A first device is connected to the valve spool of the first servo valve for selectively rotating said first servo valve spool, said first device being mounted on said mounting plate adjacent said first servo valve spool. A second device is connected to the valve spool of the second servo valve for selectively rotating the second servo valve spool, said second device being mounted on said mounting plate adjacent said second servo valve spool. A third device interconnects the first and second devices for causing simultaneous rotation of said valve spools in response to a single input signal to one of the first and second devices.

5 Claims, 3 Drawing Figures

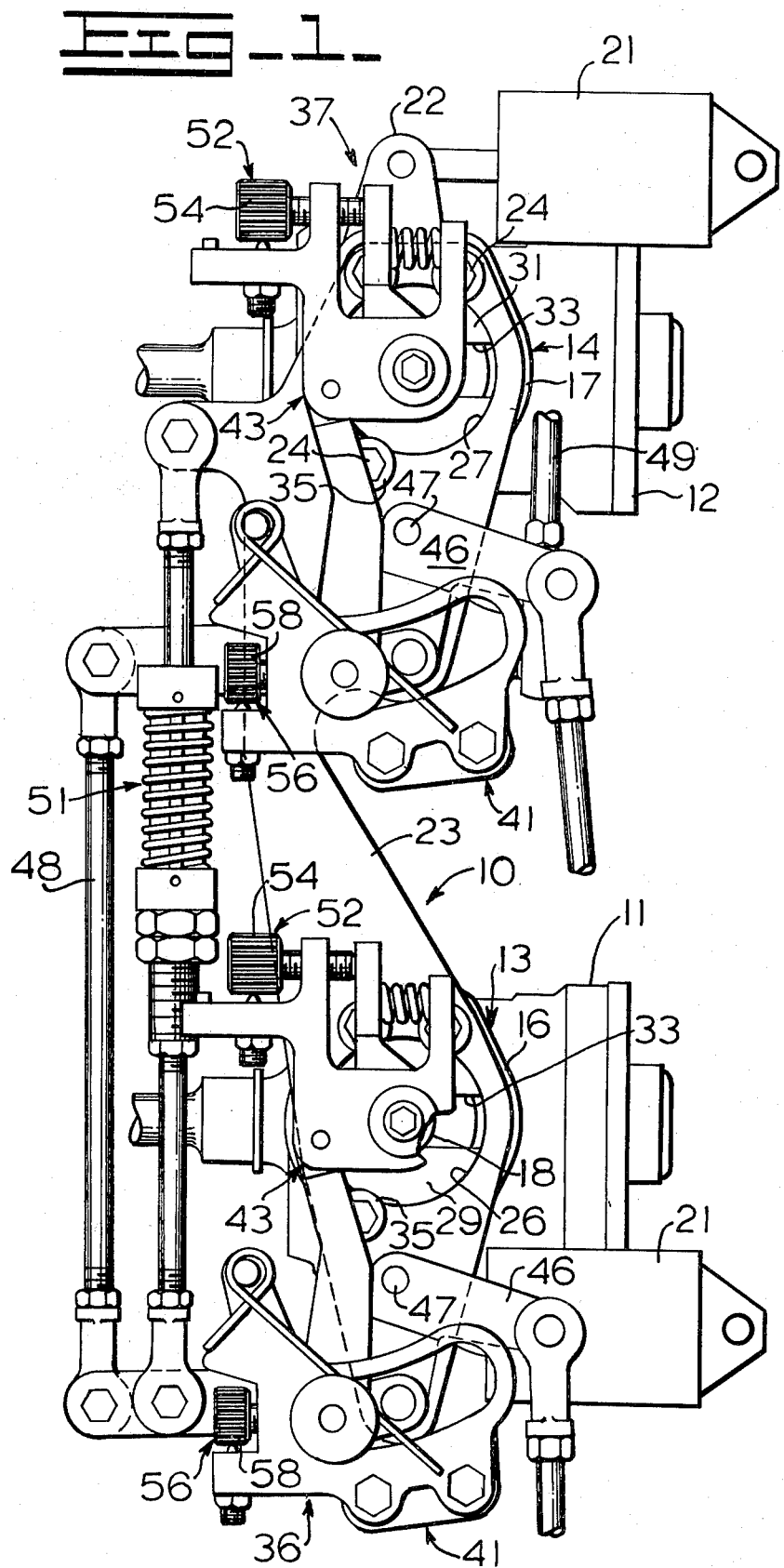
Fig_1_

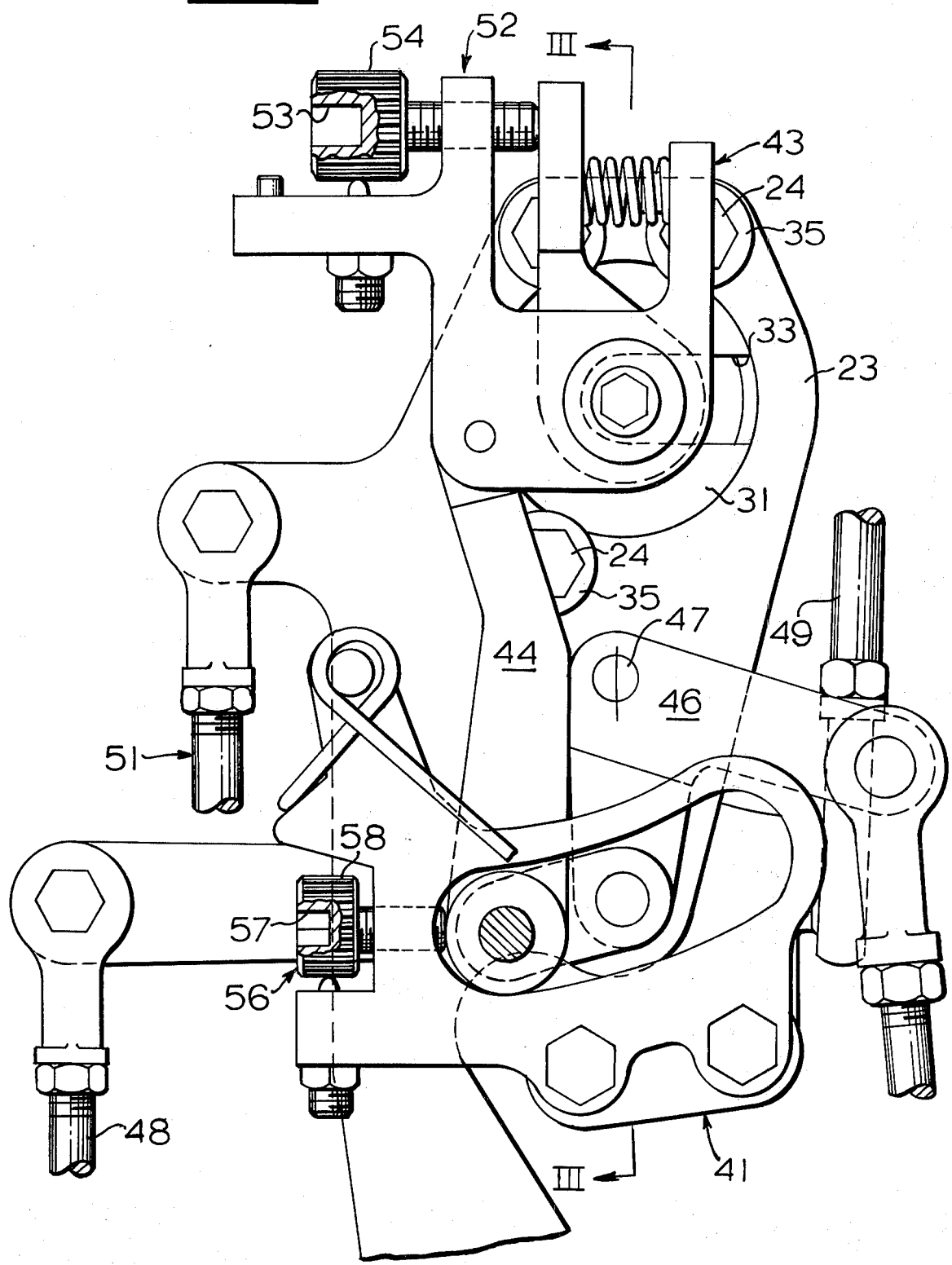
Fig_2_

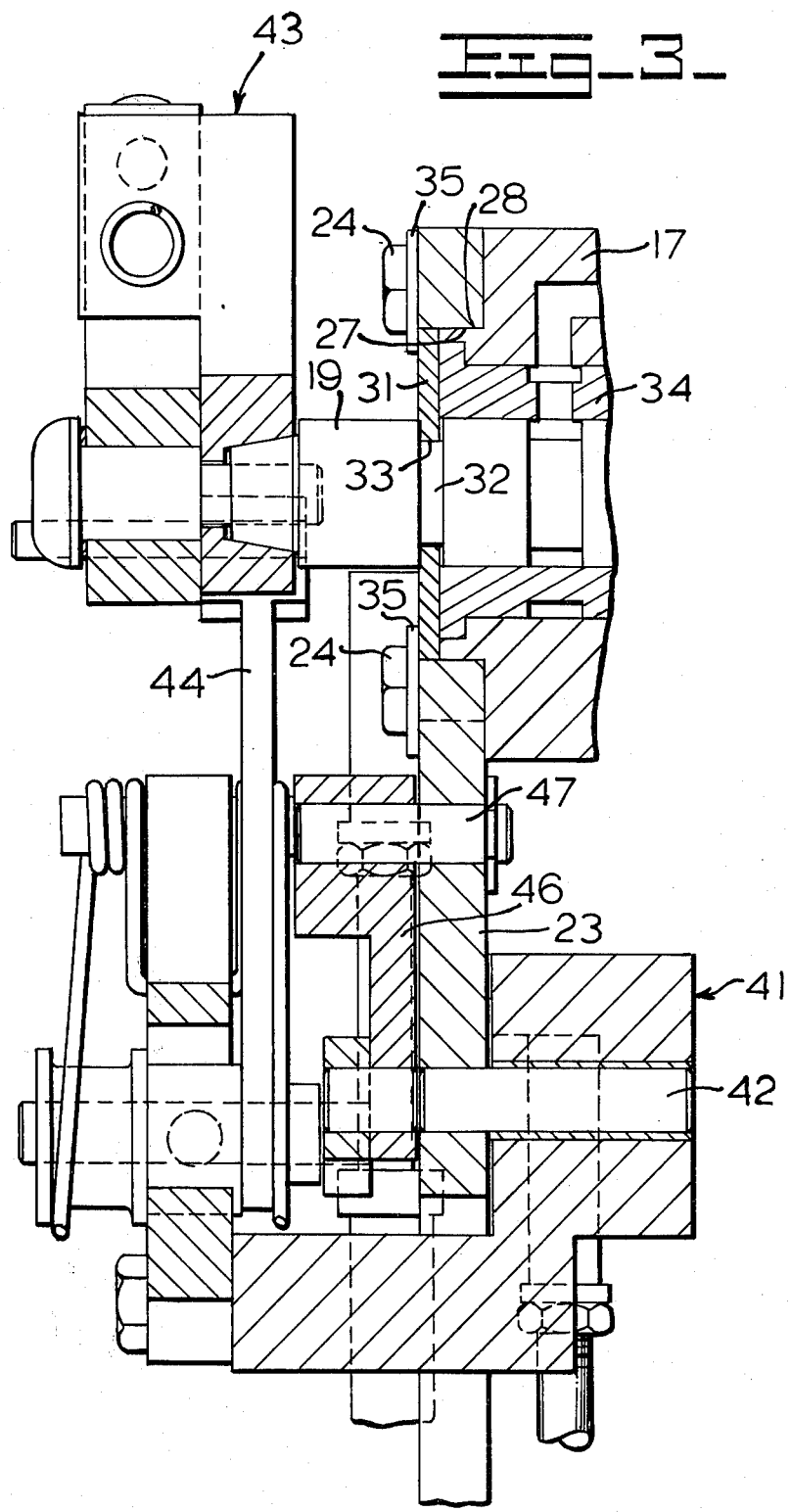

MODULAR CONTROL LINKAGE ASSEMBLY FOR A HYDROSTATIC TRANSMISSION

BACKGROUND OF THE INVENTION

Hydrostatic transmissions for track-type tractors commonly have each of a pair of substantially identical control linkage assemblies connected to the individual servo valves for selectively rotating the valve spools of the servo valves for operation of the transmission. Each of the control assemblies normally have several links and levers. Heretofore, with such control linkage designs, the individual levers and links have been connected to the respective valve spools in a piecemeal fashion after the pumps and servo valves have been installed in the transmission case. One of the problems encountered therewith is that all adjustments to the control linkage to center the valve spools must be made after all the components are assembled. Likewise, the adjustment to synchronize one control linkage with the other also has to be made after all the components are connected to the servo valves within the transmission case. Furthermore, repair or servicing of the servo valves requires that many of the levers and links be removed individually for access to the servo valves and when they are reassembled, the adjustments to center the valve spools and synchronize their movement must be made again. Also, since the servo valves are not directly interconnected one with the other, once the control linkages are connected to the servo valves and the adjustments made to center the valve spools, slight distortions in the transmission case can throw the adjustments off.

SUMMARY OF THE INVENTION

The present invention is directed to overcoming one or more of the problems as set forth above.

According to the present invention, a modular control linkage assembly for a hydrostatic transmission having a pair of variable displacement overcenter hydraulic pumps and first and second rotary servo valves, each servo valve having a housing connected to the respective pump and a valve spool rotatably positioned within the housing for controlling the output displacement of the respective pump, includes a mounting plate extending between and releasably connected to said housings of the first and second servo valves. A first means is connected to the valve spool of the first servo valve for selectively rotating said first servo valve spool, said first means being mounted on said mounting plate adjacent said first servo valve spool. A second means is connected to the valve spool of the second servo valve for selectively rotating said second servo valve spool, said second means being mounted on said mounting plate adjacent said servo valve spool. A third means interconnects said first and second means for causing simultaneous rotation of said valve spools in response to a single input signal to one of the first and second means.

BRIEF DESCRIPTION OF THE DRAWINGS

FIG. 1 is a diagrammatic plan view of the apparatus of the present invention;

FIG. 2 is an enlarged plan view of a portion of the apparatus of FIG. 1; and

FIG. 3 is a sectional view taken along line III of FIG. 2.

DETAILED DESCRIPTION

Referring now to FIG. 1 of the drawings, a modular control lingage assembly 10 is connected to a pair of variable displacement overcenter pumps 11, 12 of a hydrostatic transmission, not shown. First and second rotary servo valves 13, 14 have housings 16, 17 connected to the respective pumps and valve spools 18, 19 (FIG. 3) rotatably positioned within the respective housings 16, 17. Rotation of the valve spools 18, 19 of each servo valve directs pressurized fluid to the opposite ends of a hydraulic cylinder 21 connected to a variable angle swash plate 22 which controls the output displacement of the respective pump.

A mounting plate 23 extends between and is releasably connected to the housings 16, 17 by a plurality of bolts 24. The mounting plate has a pair of bores 26, 27 therein. The bores are spaced one from the other a preselected distance.

Referring to FIGS. 1 and 3, each of the housings 16, 17 has an annular projection 28 extending into the respective bore 26 or 27 of the mounting plate 23. A pair of circular retainer plates 29, 31 are positioned within the bores 26, 27. Each circular retainer plate is seated on the respective annular projection 28. An annular groove 32 in each of the valve spools 18, 19 is positioned within a U-shaped notch 33 in the circular retaining plates for positioning the valve spools axially relative to the housing 16, 17.

A means, for example washers 35, is positioned beneath the heads of bolts 24 and extend slightly beyond the bores 26, 27 for retaining the circular retainer plates 29, 31 within the bores.

A means, preferably a control linkage assembly 36, is connected to the valve spool 18 of the rotary servo valve 13 for selectively rotating the valve spool 18. Means 36 is mounted on the mounting plate 23 adjacent the valve spool 18. Another means, preferably a control linkage 37 is connected to the valve spool 19 of the servo valve 14. Means 37 is mounted on the mounting plate 23 adjacent the valve spool 19.

The control linkages 36 and 37 are well known in the art and are exemplified by U.S. Pat. No. 3,772,964 and 3,990,320, both assigned to the assignee of the present application. Each of the control linkages has a first lever assembly 41 pivotally mounted to the mounting plate by a pin 42, FIG. 3, a second lever assembly 43 connected to the respective valve spool 18 or 19, and a link 44 connecting the first lever assembly to the second lever assembly. A bell crank 46 is pivotally connected to the mounting plate by a pin 47.

Means, preferably a tie rod 48, interconnects the first lever assemblies 41 of the control linkages 36, 37 for causing simultaneous rotation of the first lever assemblies and hence the second lever assemblies 43 and valve spools 18, 19 in response to a single input signal on control rod 49 which has one end connected to the first lever assembly of control linkage 37.

A resilient centering mechanism 51 has one end pivotally connected to the mounting plate 23 and preferably has its other end pivotally connected to the first lever assembly 41 of the control linkage 36. The centering mechanism centers the control linkages 36, 37 and hence the valve spools 18, 19 in the neutral position shown which corresponds to zero displacement of the pumps 11, 12. Alternatively, the other end of the centering mechanism can be pivotally attached to the first lever assembly of the control linkage 37 or to the tie rod 48.

Each of the second lever assemblies 43 preferably has a null adjustment means 52 connected thereto for selectively centering the respective valve spool 18 or 19 individually at its neutral position. A tool receiving socket 53 in one end of an adjusting screw 54 opens toward one side of the transmission and is positioned at a location sufficient for receiving an adjusting tool inserted from the one side of the transmission.

Each of the first lever assemblies 41 preferably has a gain adjustment means 56 connected thereto for assuring equal rotation of the valve spools 18, 19 upon rotation of the first lever assemblies. A tool receiving socket 57 in one end of an adjusting screw 58 opens towards the one side of the transmission and is positioned at a location sufficient for receiving an adjusting tool inserted from the one side of the transmission.

When the control rod 49 is moved in a downward direction, as viewed in FIGS. 1 and 2, the valve spools 18, 19 are rotated in a first direction resulting in a tilting of the swash plates 22 and fluid output from the pumps 11, 12 to drive the transmission in a preselected direction. Conversely, movement of the control rod 49 in an upward direction causes the valve spools 18, 19 to be rotated in an opposite direction for swiveling the swash plates in the opposite direction for driving the transmission in the opposite direction.

Steering the vehicle is accomplished in the usual manner by pivotal movement of one of the bell cranks 46 when the first lever assemblies 41 are in a displaced or actuated position away from the neutral position shown in the drawings.

During assembly of the hydrostatic transmission, the servo valve housing s 16, 17 are first placed within the transmission case with the projections 28 of the housings spaced at said preselected distance of the bores 26, 27 in the mounting plate 23, inserted into the transmission case, and connected to the servo valves 13, 14 as a modular unit. This preassembly of the control linkages, tie rod and centering mechanism permits the position of the first and second lever assemblies to be preadjusted before the unit is inserted into the case and before the second lever assemblies are connected to the servo valve spools 18, 19.

When it is desirable or necessary to service or repair either of the servo valves 13, 14, the bolts 24 can be removed thereby permitting the mounting plate 23, the control linkages 36, 37, and valve spools 18, 19 to be removed as a unit with little or no disturbances of the adjustments. When the servicing or repairs are completed, the modular unit can be reinstalled in a reverse order. Alternatively, one or both of the second lever assemblies 43 can be disconnected from the respective valve spool 18 or 19 thereby permitting one or both of the valve spools to remain positioned within the respective housing 16 or 17.

Other aspects, objects and advantages of this invention can be obtained from a study of the drawings, the disclosure and the appended claims.

The embodiments of the invention in which an exclusive property or privilege is claimed are defined as follows:

1. A modular control linkage assembly for a hydrostatic transmission having a pair of variable displacement overcenter hydraulic pumps and first and second rotary servo valves, each servo valve having a housing connected to the respective pump and a valve spool rotatably positioned within the housing for controlling the output displacement of the respective pump, comprising:
   a mounting plate extending between and releasably connected to said housings of the first and second servo valves;
   first means connected to the valve spool of the first servo valve for selectively rotating said first servo valve spool, said first means being mounted on said mounting plate adjacent said first servo valve spool;
   second means connected to the valve spool of the second servo valve for selectively rotating said second servo valve spool, said second means being mounted on said mounting plate adjacent said second servo valve spool; and
   third means interconnecting said first and second means for causing simultaneous rotation of said valve spools in response to a single input signal to one of the first and second means.

2. The modular control linkage assembly of claim 1 including a centering mechanism connected to the mounting plate and to one of said first, second and third means.

3. The modular control linkage assembly of claim 1 including first and second bores in said mounting plate and spaced one from the other, an annular groove formed in each of the valve spools, a pair of circular retainers having a U-shaped notch therein, said circular retainers being positoned within the first and second bores and seated on the respective housing of said first and second servo valves, said annular groove of each valve spool being positioned within the U-shaped notch of the respective circular retainer, and means for retaining the circular retainer within the bores.

4. The modular control linkage assembly of claim 3 including an annular projection on each of said housings and extending into the respective first and second bores, each of said circular retainers being seated on the respective annular projection.

5. The modular control linkage assembly of claim 4 wherein said first and second means each have a null adjustment means having a first adjusting tool receiving means, and a gain adjusting means having a second adjusting tool receiving means, said first and second tool receiving means being of a construction and positioned at a location sufficient for receiving adjusting tools inserted from one side of the transmission.

* * * * *